United States Patent
De Haan et al.

(10) Patent No.: US 7,949,205 B2
(45) Date of Patent: May 24, 2011

(54) IMAGE PROCESSING UNIT WITH FALL-BACK

(75) Inventors: Gerard De Haan, Eindhoven (NL); Paul Wilhelm Albert Cornelis Biezen, Eindhoven (NL); Rimmert B. Wittebrood, Eindhoven (NL)

(73) Assignee: Trident Microsystems (Far East) Ltd., Grand Cayman (KY)

(*) Notice: Subject to any disclaimer, the term of this patent is extended or adjusted under 35 U.S.C. 154(b) by 1325 days.

(21) Appl. No.: 10/531,931

(22) PCT Filed: Oct. 1, 2003

(86) PCT No.: PCT/IB03/04352
§ 371 (c)(1),
(2), (4) Date: Apr. 19, 2005

(87) PCT Pub. No.: WO2004/039074
PCT Pub. Date: May 6, 2004

(65) Prior Publication Data
US 2006/0045365 A1    Mar. 2, 2006

(30) Foreign Application Priority Data
Oct. 22, 2002 (EP) .................................... 02079389

(51) Int. Cl.
*G06K 9/32* (2006.01)
*G06K 9/00* (2006.01)
*G06K 9/46* (2006.01)
*H04N 5/14* (2006.01)
*H04N 9/64* (2006.01)

(52) U.S. Cl. ......... 382/300; 382/107; 382/236; 348/699

(58) Field of Classification Search .................. 382/236; 348/452
See application file for complete search history.

(56) References Cited

U.S. PATENT DOCUMENTS
5,057,921 A * 10/1991 Robert et al. ................. 348/459
(Continued)

FOREIGN PATENT DOCUMENTS
CN    1158052 A    8/1997
(Continued)

OTHER PUBLICATIONS
Thomson, "Problems of Estimation and Measurement of Motion in Television", IEE Colloquium on Motion Reproduction in Television, May 3, 1995, pp. 6/1-6/10.*
(Continued)

*Primary Examiner* — Brian Q Le
*Assistant Examiner* — Jose M Torres
(74) *Attorney, Agent, or Firm* — DLA Piper LLP (US)

(57) ABSTRACT

An image processing unit for computing a sequence of output images on basis of a sequence of input images, comprises: a motion estimation unit for computing a motion vector field on basis of the input images; a quality measurement unit for computing a value of a quality measure for the motion vector field; an interpolation unit for computing the output images by means of interpolation of pixel values of the input images, on basis of the motion vector field; and control means to control the interpolation unit on basis of the quality measure. The quality measurement unit is arranged to compute the value of the quality measure on basis of a maximum difference between neighboring motion vectors. If the value of the quality measure is lower than a predetermined threshold, then a motion compensated interpolation is performed, else a non-motion compensated interpolation is performed.

5 Claims, 4 Drawing Sheets

U.S. PATENT DOCUMENTS

| | | | | |
|---|---|---|---|---|
| 5,162,907 A | * | 11/1992 | Keating et al. | 375/240.16 |
| 5,410,356 A | | 4/1995 | Kikuchi et al. | |
| 5,546,130 A | | 8/1996 | Hackett et al. | |
| 5,642,170 A | * | 6/1997 | Hackett et al. | 348/459 |
| 5,784,114 A | * | 7/1998 | Borer et al. | 348/452 |
| 5,929,919 A | * | 7/1999 | De Haan et al. | 348/452 |
| 5,940,145 A | | 8/1999 | Burl | |
| 5,959,681 A | | 9/1999 | Cho | |
| 6,285,804 B1 | * | 9/2001 | Crinon et al. | 382/299 |
| 6,345,106 B1 | | 2/2002 | Borer | |
| 6,377,621 B2 | * | 4/2002 | Borer | 375/240 |
| 6,442,202 B1 | * | 8/2002 | Borer | 375/240.16 |
| 6,442,203 B1 | * | 8/2002 | Demos | 375/240.16 |
| 6,459,455 B1 | * | 10/2002 | Jiang et al. | 348/452 |
| 6,661,464 B1 | * | 12/2003 | Kokkosoulis et al. | 348/448 |
| 7,042,512 B2 | * | 5/2006 | Yang et al. | 348/452 |
| 7,242,435 B2 | * | 7/2007 | Lin et al. | 348/448 |

FOREIGN PATENT DOCUMENTS

| | | | |
|---|---|---|---|
| JP | 05-68239 | | 3/1993 |
| JP | 06-165133 | | 6/1994 |
| JP | 07-222167 | A | 8/1995 |
| JP | 07-287773 | | 10/1995 |

OTHER PUBLICATIONS

A. Murat Tekalp; Digital Video Processing; Feb. 1995.

Gerard De Haan, et al.; True-Motion Estimation with 3-D Recursive Search Block Matching; vol. 3, No. 5 Oct. 1993; pp. 368-379.

R. B. Wittebrood, et al.; Second Generation DSP Software for Pictrure Rate Conversion; 2000 IEEE, pp. 230-231.

G.de Haan: "Motion Estimation and Compensation", Ph.D. thesis, Technical University Delft, 1992.

Csillag, P. et al: "Frame Rate Conversion Based on Acceleration and Motion-Based Segmentation", Digital Compression Technologies and Systems for Video Communications, Berlin, German, Oct. 7-9, 1996, vol. 2952, pp. 438-448, XP008027989 Proceedings of SPIE—The international Society for Optical Engineering, 1996, SPIE-Int. Soc. Opt. Eng. USA ISSN: 0277-786X.

Wittebrood, R. B. et al.: "Second Generation video format conversion software for a digital signal processor", IEEE Tranactions on consumer electronics, 46(3): 857-865, Aug. 2000.

de Haan, Gerard: "Video processing for multimedia systems", University Press Eindhover, 2000, ISBN: 90-9014015-8.

* cited by examiner

IMAGE PROCESSING UNIT WITH FALL-BACK

RELATED APPLICATIONS

This application claims the priority benefits as a National Stage filing of PCT International Application PCT/IB2003/004352, filed Oct. 1, 2003, which claims priority to European Application No. 02079389.9, filed Oct. 22, 2002.

The invention relates to an image processing unit for computing a sequence of output images on basis of a sequence of input images, comprising:

- a motion estimation unit for computing a motion vector field on basis of the input images, the motion vector field comprising a first motion vector belonging to a first group of pixels and a second motion vector belonging to a second group of pixels;
- a quality measurement unit for computing a value of a quality measure for the motion vector field;
- an interpolation unit for computing a first one of the output images by means of interpolation of pixel values of the input images, the interpolation being based on the motion vector field; and
- control means to control the interpolation unit on basis of the quality measure.

The invention further relates to an image processing apparatus comprising:

- receiving means for receiving a signal corresponding to a sequence of input images; and
- such an image processing unit for computing a sequence of output images on basis of the sequence of input images.

The invention further relates to a method of computing a sequence of output images on basis of a sequence of input images, comprising:

- computing a motion vector field on basis of the input images, the motion vector field comprising a first motion vector belonging to a first group of pixels and a second motion vector belonging to a second group of pixels;
- computing a value of a quality measure for the motion vector field;
- computing a first one of the output images by means of interpolation of pixel values of the input mages, the interpolation being based on the motion vector field; and
- controlling the interpolation of pixel values on basis of the quality measure.

Motion estimation plays an important role in many video signal processing applications. The resulting image quality of applications like picture rate up-conversion, de-interlacing and video compression can be greatly improved by using motion vectors. For video compression, i.e. encoding, motion estimation is important to minimize the storage and transmission requirements. In particular for motion estimation units that are used for picture rate up-conversion, de-interlacing and video format conversion in general, it is important that they result in "true" motion vector fields. The "true" motion vector field describes the actual motion in the image accurately. Usually, motion estimation units for encoding do not have this strict condition. In that case, an effect of an inaccurate motion vector field is extra storage and transmission requirements.

A large number of different motion estimation algorithms is described in literature. For a survey see the book "Digital Signal Processing", by A. Tekalp, Prentice Hall, 1995, ISBN 0-13-190075-7. Many motion estimation units are too computational complex for consumer applications or do not reach the required quality level necessary for consumer applications. Motion estimation algorithms like three-dimensional recursive search as described by G. de Haan in "Motion estimation and compensation", Ph.D. thesis, Technical University Delft, 1992 or the object based estimator described in "Second generation DSP software for picture rate conversion", by R. Wittebrood and G. de Haan, in Proceedings of ICCE, pages 230-231, IEEE, June 2000, attempt to estimate the true motion and succeed in that for a great number of video sequences. However, there remain video sequences for which the motion estimation units fail to estimate the true motion. Typical video sequences where this might happen are sequences with very large motions, large homogeneous areas, repeating structures and sequences with large accelerations or small moving objects. If the motion estimation unit fails to estimate the correct motion the use of these incorrect, inaccurate motion vectors might give annoying artifacts in the motion compensated result. These artifacts might even be larger than the artifacts generated by less complex compensation algorithms which aim at a similar result. Therefore, it is necessary to detect whether or not the motion estimation unit has done a good job, i.e. whether or not the resulting motion vector field is correct and accurate.

A number of different algorithms for detecting erroneous motion vector fields are known from literature and/or are implemented in current electronic devices. In the following a number of these approaches is discussed. That means that a number of quality measures for motion vector fields are described. Motion estimation units usually fail when large velocities are present in the image. This is caused by the limited range some motion estimation units define for the motion vectors. This can be seen in block matchers (see the cited book "Digital Signal Processing"). Another reason is that the assumptions behind a motion estimation unit are only valid for small motions and become more and more inaccurate with increasing motion. This is true for pixel-recursive estimators or optical flow estimators (see the cited book "Digital Signal Processing"). A much used indicator for the quality of the motion vector field is therefore some measure of the magnitude of the motion of the objects which are present in the video sequence. A fall-back algorithm is switched on when the motion of an object, segment, image region, or block exceeds a predetermined threshold. The concept of using a fall-back algorithm is disclosed in EP 0.648.046. This can be implemented for example as follows:

$$\begin{cases} \frac{1}{N}\sum_{\vec{x}\in R} |\vec{D}(\vec{x})| > T_1 & \text{fallback} \\ \text{else no} & \text{fallback} \end{cases} \quad (1)$$

where N is the number of motion vectors $\vec{D}(\vec{x})$ at location $\vec{x}$ in the region R for which the decision must be made, whether or not fall-back processing should be switched on. $T_1$ is a threshold value which might be locally adapted to the image content.

In general, motion estimation is an optimization problem. For every object, segment, image region, or block in the image a match error is minimized over a set of candidate motion vectors. For example, this match error might be the Sum of Absolute Difference (SAD):

$$SAD = \sum_{\vec{x}\in R} |F(\vec{D}(\vec{x}), n) - F(\vec{D}(\vec{x}), n-1)| \quad (2)$$

Other match criteria are the cross correlation and the mean squared error. The idea is obvious, the better the motion vector, the lower the match error. Hence, the match error is an indicator of the quality of the motion vector and can be used to detect erroneous motion vectors. If the match error for an object exceeds a predetermined threshold, than the probability is large that the motion vector is incorrect. This type of fall-back detection is disclosed in U.S. Pat. Nos. 5,940,145 and 5,546,130. As an illustration:

$$\begin{cases} \sum_{\vec{x} \in R} |F(\vec{x},n) - F(\vec{x} - \vec{D}(\vec{x}), n-1)| > T_2 & \text{fallback} \\ \text{else no} & \text{fallback} \end{cases} \quad (3)$$

where the motion compensated difference is summed over all positions $\vec{x}$ in region R. $F(\vec{x},n)$ and $F(\vec{x},n-1)$ are luminance values of the current and previous images and $\vec{D}(\vec{x})$ is the motion vector at location $\vec{x}$.

In general, the true motion vector fields of natural image sequences are consistent both spatially and temporally. It is known that the spatial and temporal inconsistency measures are relatively good indicators of the correctness of the motion vector field. See G. de Haan in "Motion estimation and compensation", Ph.D. thesis, Technical University Delft, 1992. If the motion vector field is too inconsistent, spatially or temporally, a fall-back algorithm has to be switched on. For example, in case of temporal inconsistency:

$$\begin{cases} \sum_{\vec{x}} |\vec{D}(\vec{x},n) - \vec{D}(\vec{x}, n-1)| > T_3 & \text{fallback} \\ \text{else no} & \text{fallback} \end{cases} \quad (4)$$

where all differences between corresponding motion vectors of successive images are summed. In case of spatial inconsistency:

$$\begin{cases} \sum_{\vec{x}} \sum_{\vec{y} \in S(\vec{x})} |\vec{D}(\vec{x}) - \vec{D}(\vec{y})| > T_4 & \text{fallback} \\ \text{else no} & \text{fallback} \end{cases} \quad (5)$$

where $S(\vec{x})$ is a set containing all neighboring positions of $\vec{x}$.

It is also possible to use a combination of multiple quality measures, e.g. of the types described above. The combination gives more robust results than the individual measures alone. Depending on this combined measure it can then be decided if a fall-back algorithm has to be switched on. This approach is disclosed in U.S. Pat. No. 5,546,130.

Instead of selecting fall-back or no-fall-back, the quality measures can also be used to make a more gradual transition between the interpolation algorithms. In that case the quality measures are used as a mixing parameter and the results of the fall-back interpolation and the motion compensated interpolation are mixed together in a ratio determined by the mixing parameter, i.e. the quality measure for the motion vector field.

In general the quality measures described above are relatively good indicators of the overall quality of the motion vector field. As such, they are a applicable as detectors for fall-back processing. However there are situation in which these indicators fail. A typical example is a relatively small object which has a relatively high velocity compared with its neighborhood. This will be explained by means of an example. Assume an image sequence of a plane which is flying against a background of mountains. The plane is being tracked by the camera and the background moves from left to right. The average luminance value of the plane is slightly lower than the average luminance value of the background and the size of the plane is in the order of 5 blocks, with a block comprising 8*8 pixels. The velocity of the background is high but can be estimated correctly by the motion estimation unit. The problem is with the relatively small plane. The motion estimation unit fails in estimating the motion of the plane. A number of blocks is assigned the correct motion, but other blocks are assigned the velocity of the background. Because of the relatively large difference between the motion of the plane and the motion of the background, considerable artifacts can result from using these motion vectors. In the case of picture rate up-conversion the plane will break down in pieces, one described by the correct motion and another described by the velocity of the background. In general, the eye of the observer will be focussed on the plane, because this is the object tracked by the camera. An incorrect rendering of the plane will be very annoying.

It is an object of the invention to provide an image processing unit of the kind described in the opening paragraph which has an improved detection of erroneous motion vector fields.

This object of the invention is achieved in that the quality measurement unit is arranged to compute the value of the quality measure on basis of a maximum difference between the first motion vector and the second motion vector. Preferably the first group of pixels is a neighboring group of pixels of the second group of pixels. Typically the groups of pixels are blocks of pixels. Preferably the interpolation unit is arranged to perform a motion compensated interpolation of the pixel values of the input images on basis of the motion vector field, if the value of the quality measure is lower than a predetermined threshold and is arranged to perform an alternative interpolation of the pixel values of the input images, if the value of the quality measure is higher than the predetermined threshold.

An important observation is that the above described artifact, i.e. objects being broken down in pieces, will become more visible and annoying as the difference between the correct and the assigned motion grows. If it is possible to detect the difference between the correct and the assigned motion, then it would be possible to go into fall-back when this difference exceeds a predetermined threshold. Since the correct motion is not known, a heuristic approach is required. The most obvious artifacts of the aforementioned kind occur when a small object is tracked against a moving background. Since the object is tracked, its velocity is close to zero. If the zero velocity is included in the motion vector candidate set for which the motion estimation unit minimizes the match error, then the probability is high that a number of blocks within the tracked object is assigned the correct motion vector, i.e. zero motion. Obviously, the other blocks in the tracked object will be assigned the wrong motion vector, the motion vector of the background. As a result the wrong and correct motion vectors will be present within the tracked object and somewhere in this object the correct and wrong vectors will be on neighboring blocks. Ergo, the difference or absolute difference between the motion vectors of two neighboring groups of pixels is an adequate approximation of the difference between the correct and assigned motion in a tracked object. The maximum of these differences, called the local motion vector contrast is a good measure for fall-back detection:

$$\begin{cases} \max_{\vec{x},\vec{y}\in S(\vec{x})} \{|\vec{D}(\vec{x}) - \vec{D}(\vec{y})|\} > T_4 & \text{fallback} \\ \text{else no} & \text{fallback} \end{cases} \quad (6)$$

The other quality measures described above, i.e. the quality measures as specified in Equations 1, 3-5, are not able to detect this artifact. If the velocity of the objects is not exorbitantly high, then by applying Equation 1 the problem is not detected. The average match error will be low, because the motion of the complete background is estimated correctly. Since the luminance values of the plane and the background are relatively similar, the local match error is also low. Thus, Equation 3 is also insufficient. The motion vector field also shows a very high spatial and a very high temporal consistency. So, Equations 4 and 5 will not trigger the fall-back processing.

Although the explanation focuses on the case in which small objects are tracked by a camera, the difference of the motion vectors between neighboring blocks is a good measure in many cases. The following reasons make this plausible. First of all, block boundaries do not coincide with real object boundaries and this will give artifacts, even if the motion vectors of the respective blocks are correct. In general, these artifacts will be more noticeable when the difference between motion vectors of neighboring blocks is larger. Secondly, current motion estimation units fail in occlusion regions. In these regions a typical artifact, called halo, occurs. Halo is one of the major problems of current motion estimation units. This halo is small if the neighboring velocities in the occlusion area are similar, but the larger the difference, the larger the halo and the more visible and annoying the halo is. Thirdly, true motion vector fields are consistent both temporally and spatially. As a matter of fact, almost all motion estimation units force this consistency upon the motion vector field. Finally, in case the motion estimation unit is implemented on a programmable device a large difference in neighboring velocities means that there is a low probability that video data can efficiently be cached. This might lead to performance problems and artifacts resulting from these performance problems, like skipping frames.

There is an important difference between the spatial inconsistency measure, as specified in Equation 5, and the local motion vector contrast, as specified in Equation 6. Where the spatial consistency determines a measure which indicates the overall quality of the motion vector field, the local motion vector contrast indicates the probability that noticeable artifacts will be seen in the image. Hence the local motion vector contrast is a very strict measure and should particularly be used in applications where observers are very critical about artifacts and where the use of motion vectors is not vital. The spatial inconsistency measure should be used where motion vectors cannot be omitted and where resulting artifacts can be covered up in another way, e.g. in video compression.

In an embodiment of the image processing unit according to the invention in which the interpolation unit is arranged to perform the alternative interpolation, the alternative interpolation comprises a non-motion compensated interpolation. This can be achieved by providing a motion vector field comprising motion vectors equal to zero, to the interpolation unit. Alternatively motion vectors are provided to the interpolation unit, which do not correspond to the motion vectors as being computed by the motion estimation unit, but which are derived from these motion vectors, e.g. by dividing the lengths of the motion vectors by a factor. By doing this, the embodiment of the image processing unit according to the invention is arranged to gradually fade from substantially correct motion compensated interpolation to no motion compensation at all.

In another embodiment of the image processing unit according to the invention the alternative interpolation comprises a replication of the pixel values of the input images. That means that a number of input images are directly copied to form a number of output images. An advantage of this embodiment is its simplicity.

In another embodiment of the image processing unit according to the invention the quality measurement unit is arranged to compute the value of the quality measure on basis of a maximum difference between the horizontal component of the first motion vector and the horizontal component of the second motion vector. In most image sequences the objects, e.g. actors or vehicles, are moving in a horizontal direction. Focusing on horizontal movement is advantageous. Because of the same reason it is preferred that the first group of pixels, corresponding to the first motion vector, is located horizontally from the second group of pixels which corresponds with the second motion vector.

In another embodiment of the image processing unit according to the invention the predetermined threshold is an adaptive threshold. Preferably the adaptive threshold is based on match errors being computed for the motion vectors. If the match errors are relatively low then the value of the adaptive threshold should be relatively high, since the probability that the motion vectors are correct is relatively high in that case. The advantage of this embodiment according to the invention is a more robust fall-back decision strategy.

It is a further object of the invention to provide an image processing apparatus of the kind described in the opening paragraph which has an improved detection of erroneous motion vector fields.

This object of the invention is achieved in that the quality measurement unit is arranged to compute the value of the quality measure on basis of a maximum difference between the first motion vector and the second motion vector. The image processing apparatus may comprise additional components, e.g. a display device for displaying the output images. The image processing unit might support one or more of the following types of image processing:

De-interlacing: Interlacing is the common video broadcast procedure for transmitting the odd or even numbered image lines alternately. De-interlacing attempts to restore the full vertical resolution, i.e. make odd and even lines available simultaneously for each image;

Up-conversion: From a series of original input images a larger series of output images is computed. Output images are temporally located between two original input images;

Temporal noise reduction. This can also involve spatial processing, resulting in spatial-temporal noise reduction; and Video compression, i.e. encoding or decoding, e.g. according to the MPEG standard.

It is a further object of the invention to provide a method of the kind described in the opening paragraph with an improved detection of erroneous motion vector fields.

This object of the invention is achieved in that the value of the quality measure is computed on basis of a maximum difference between the first motion vector and the second motion vector.

Modifications of the image processing unit and variations thereof may correspond to modifications and variations thereof of the method and of the image processing apparatus described.

These and other aspects of the image processing unit, of the method and of the image processing apparatus according to the invention will become apparent from and will be elucidated with respect to the implementations and embodiments described hereinafter and with reference to the accompanying drawings, wherein:

Same reference numerals are used to denote similar parts throughout the figures.

Figure 1:
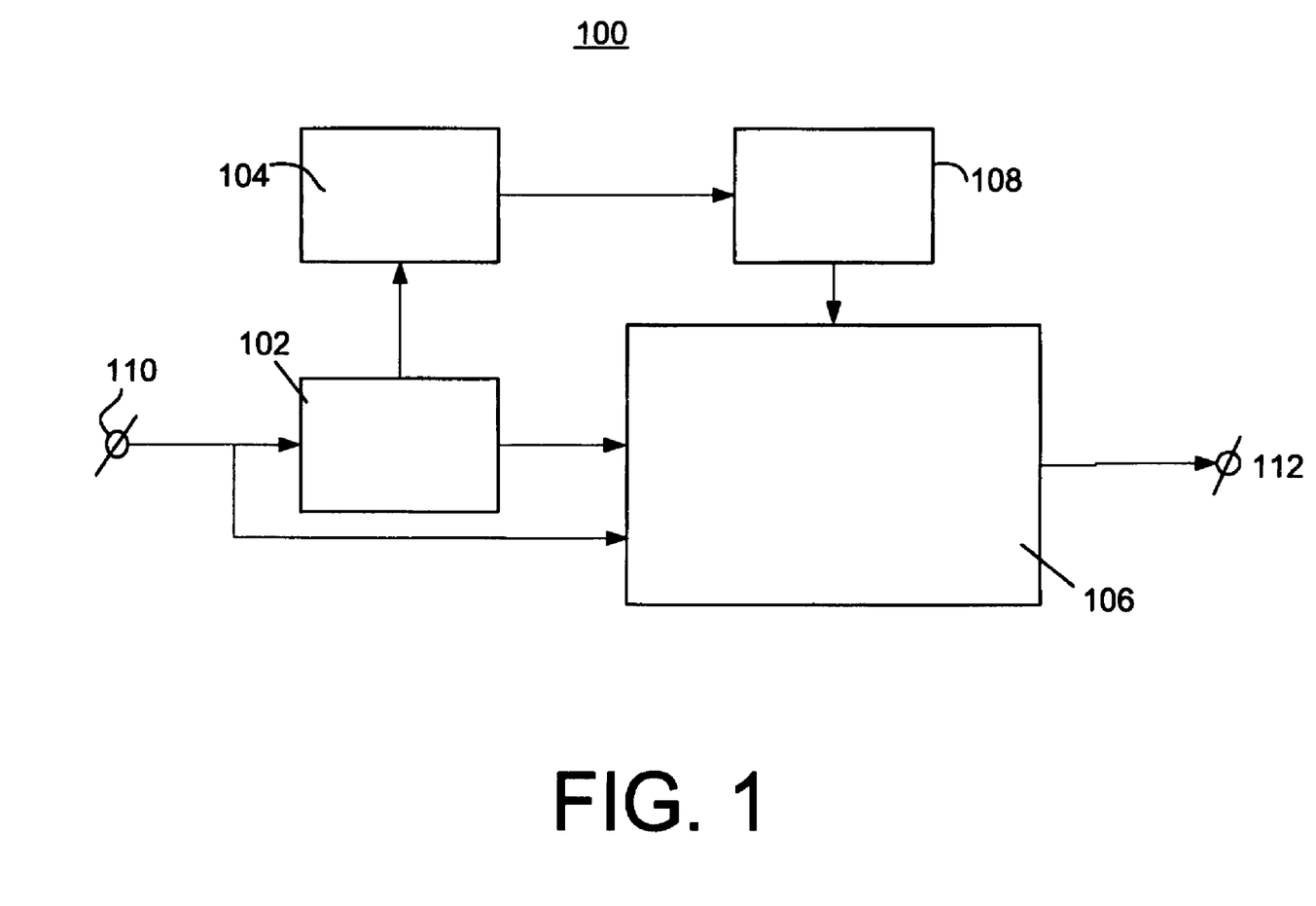
FIG. 1 schematically shows an embodiment of the image processing unit.

FIG. 1 schematically shows an embodiment of the image processing unit 100 according to the invention. In this case the image processing unit 100 corresponds to a scan-rate up-converter. The image processing unit 100 is provided with a signal representing a sequence of input images at the input connector 110 and provides a signal representing a sequence of output images at the output connector 112. The number of output images is higher than the number of input images. Some of the output images are temporally located between two original input images. The image processing unit 100 comprises:

- a motion estimation unit 102 for computing a motion vector field on basis of the input images. The motion vector field comprises motion vectors. The motion estimation unit 102 is e.g. as specified in the article "True-Motion Estimation with 3-D Recursive Search Block Matching" by G. de Haan et. al. in IEEE Transactions on circuits and systems for video technology, vol. 3, no. 5, October 1993, pages 368-379;
- a quality measurement unit 104 for computing a value of a quality measure for the motion vector field. The quality measure is computed on basis of a maximum difference between neighboring motion vectors of the motion vector field, as specified in Equation 6. Besides this calculation other calculations, e.g. as specified in Equations 1, 3-5 are performed to estimate the quality of the motion vector field;
- an interpolation unit 106 for computing a first one of the output images by means of interpolation of pixel values of the input images. The interpolation unit is designed to support various types of interpolations which range from motion compensated interpolation being based on the motion vector field as provided by the motion estimation unit 102 to replication of pixel values of the original images to achieve the output images. In connection with FIGS. 2 and 3 the various interpolations are described.
- A control unit 108 to control the interpolation unit on basis of the computed quality measure.

The working of the image processing unit 100 is as follows. For each pair of successive input images a motion vector field is computed. The quality of each motion vector field is determined by computing a quality measure. This quality measure is compared with a predetermined threshold by means of the control unit 108. If the quality of the motion vector field seems to be satisfying then the control unit triggers the interpolation unit 106 to compute motion compensated output images on basis of the motion vector field. Typically the sequence of output images comprises both straight copies of the input images and interpolated images based on multiple input images. However if the quality of the motion vector field is not satisfying, globally but in particular locally, then the type of interpolation is faded to a non-motion compensated interpolation.

It will be clear that the quality measure according to the invention can be combined with other quality measures, e.g. the quality measures as specified in Equations 1, 3-5.

The motion estimation unit 102, the quality measurement unit 104, the interpolation unit 106 and the control unit 108 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

Figure 2:
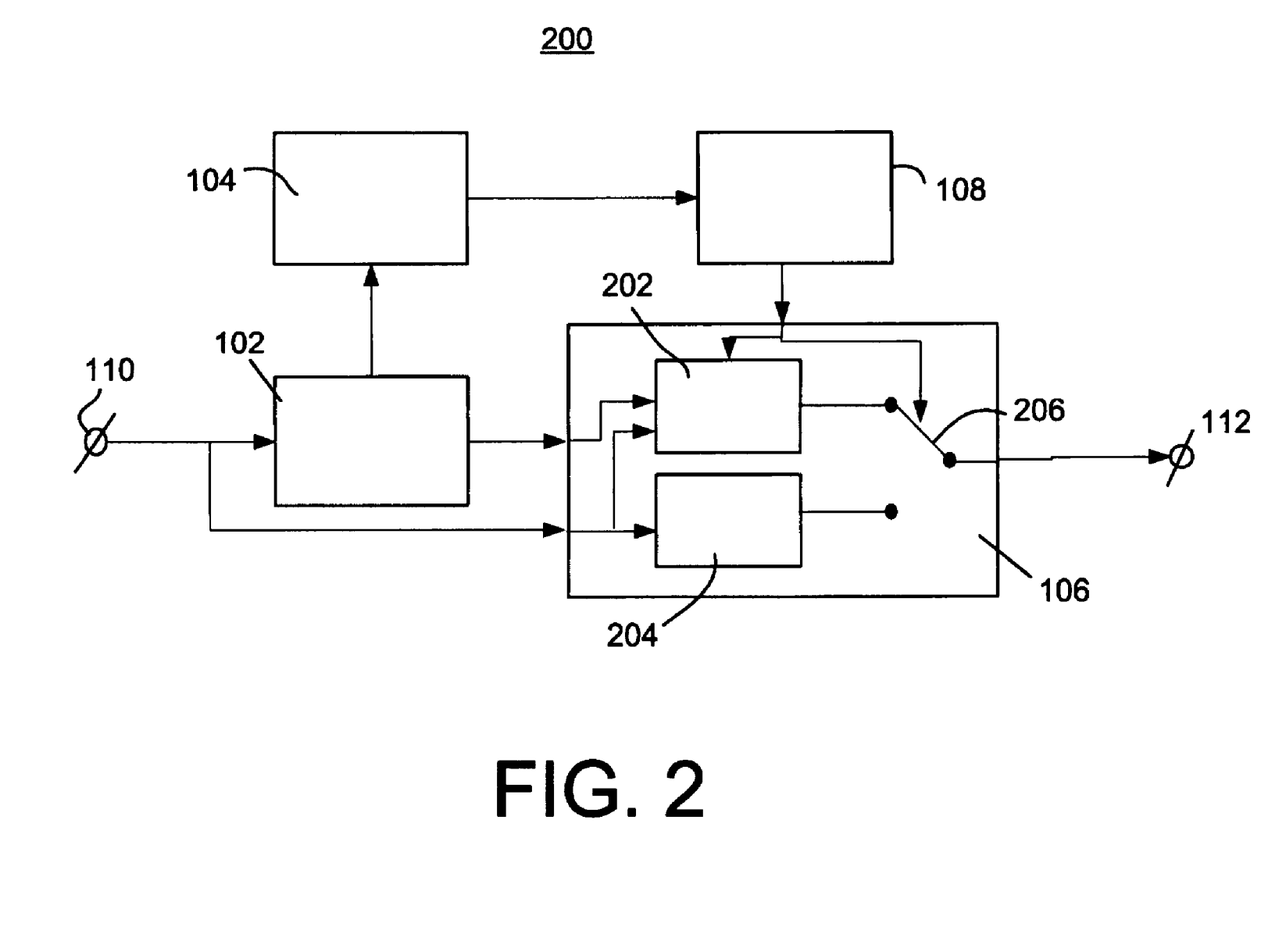
FIG. 2 schematically shows an embodiment of the image processing unit which is arranged to switch between a motion compensated and a non-motion compensated interpolator.

FIG. 2 schematically shows an embodiment of the image processing unit 200 which is arranged to switch between a motion compensated interpolator 202 and a non-motion compensated interpolator 204. The interpolation unit comprises a switch 206 which is controlled by means of the control unit 108. If the control unit 108 has determined that the quality of the motion vector field is good then the images being computed by the motion compensated interpolator 202 will be provided at the output connector 112. However if the control unit 108 has determined that the quality of the motion vector field is not good then the images being computed by the non-motion compensated interpolator 204 will be provided at the output connector 112. Hence, the interpolation unit 106 is in a motion compensated mode or in a non-motion compensated mode.

Optionally the interpolation unit 106 supports additional modes. For instance, the switch 206 remains in a state corresponding to transferring images from the motion compensated interpolator 202, although the control means 108 has just determined that the quality of the motion vector field is insufficient. But instead of computing interpolated images by directly applying the motion vector field, as being computed by the motion estimation unit 104, now the interpolation is based on modified motion vector fields. The type of modification might be multiplication of the motion vectors with weighting factors ranging from 1.0 via 0.75; 0.5; 0.25 to 0.0.

Figure 3:
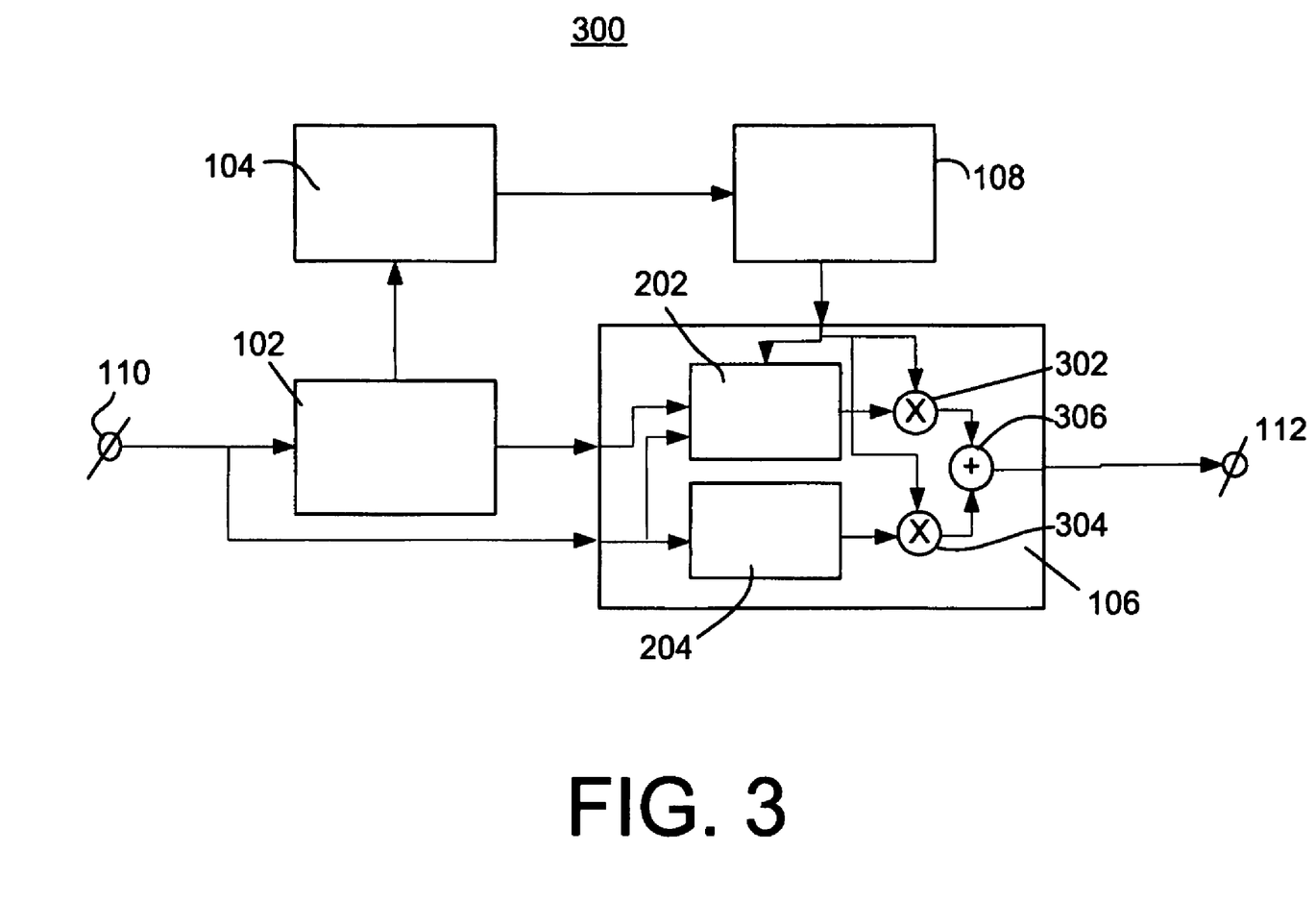
FIG. 3 schematically shows an embodiment of the image processing unit which is arranged to mix intermediate images from a motion compensated and a non-motion compensated interpolator.

FIG. 3 schematically shows another embodiment of the image processing unit 300 which is arranged to mix intermediate images from the motion compensated interpolator 202 and the non-motion compensated interpolator 204. The interpolation unit comprises two multipliers 302 and 304 which are controlled by means of the control unit 108 and an adding unit 306 for adding the two sequences of weighted intermediate images which are provided by the motion compensated interpolator 202 and the non-motion compensated interpolator 204, respectively. The multipliers 302 and 304 are arranged to multiply the two sequences of intermediate images with a first multiplication factor k and a second multiplication factor 1−k, respectively. The value of k is related to the value of the quality measure. If the quality of the motion vector field is relatively high, then the value of k equals to 1.0 and if the quality of the motion vector field is relatively low, then the value of k equals to 0.0.

Optionally the control means 108 is provided with match errors of the motion vector fields. These match errors are applied to adapt the predetermined threshold as specified in Equation 6. That means that in that case the predetermined threshold is an adaptive threshold. If the match errors are relatively low then the value of the adaptive threshold should be relatively high, since the probability that the motion vectors are correct is relatively high in that case.

Figure 4:
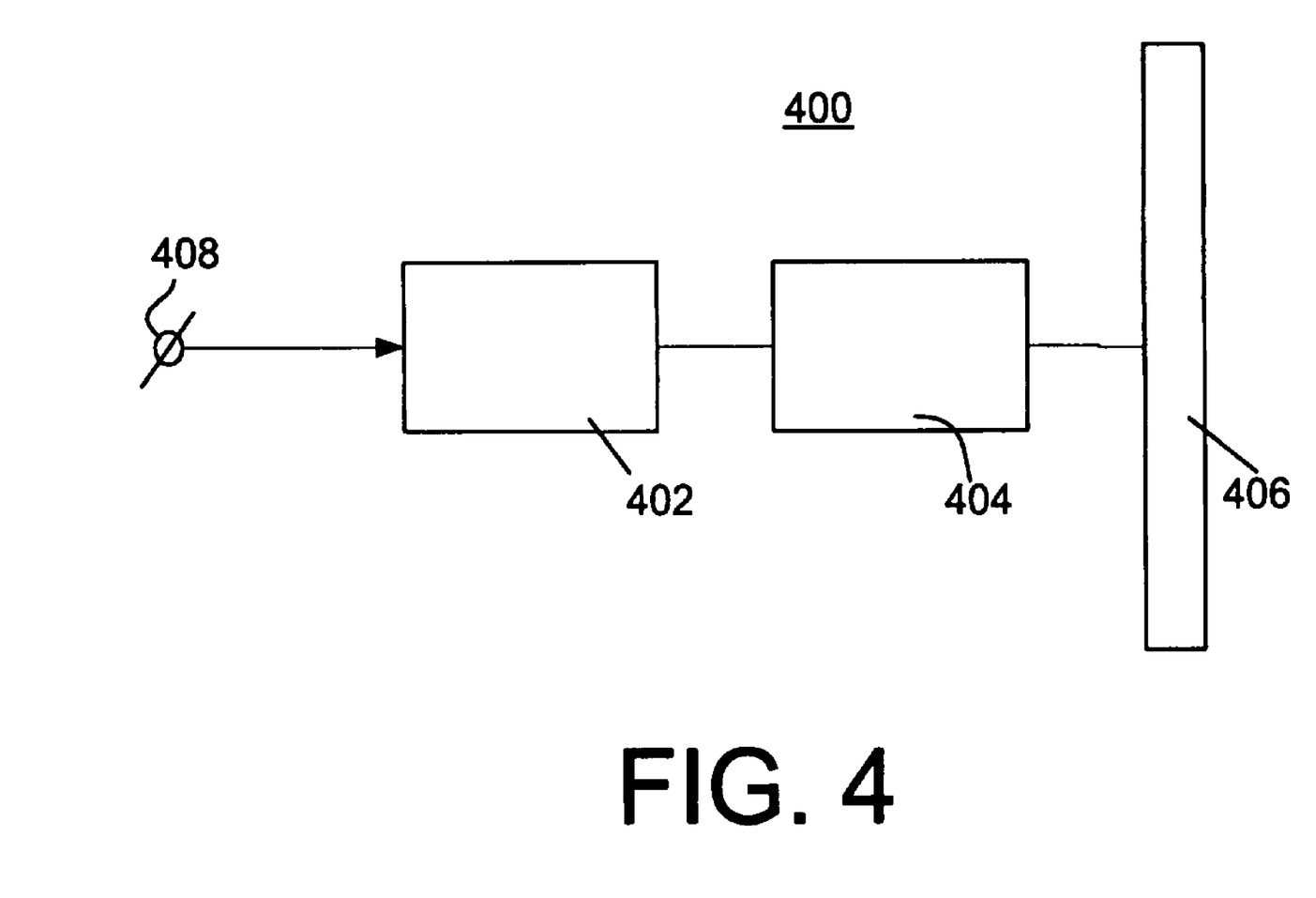
FIG. 4 schematically an embodiment of the image processing apparatus according to the invention.

FIG. 4 schematically shows an embodiment of the image processing apparatus 400 according to the invention, comprising:

Receiving means 402 for receiving a signal representing input images. The signal may be a broadcast signal received via an antenna or cable but may also be a signal from a storage device like a VCR (Video Cassette Recorder) or Digital Versatile Disk (DVD). The signal is provided at the input connector 408;

The image processing unit 404 as described in connection with any of the FIG. 1,2 or 3; and A display device 406 for displaying the output images of the image processing unit 200. This display device 406 is optional.

The image processing apparatus 400 might e.g. be a TV. Alternatively the image processing apparatus 400 does not comprise the optional display device but provides the output images to an apparatus that does comprise a display device 406. Then the image processing apparatus 400 might be e.g. a set top box, a satellite-tuner, a VCR player or a DVD player. But it might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. An image processing unit for computing a sequence of output images on basis of a sequence of input images, comprising:

a motion estimation unit for computing a motion vector field on basis of the input images, the motion vector field comprising motion vectors, wherein each of the motion vectors belongs to a group of pixels;

a quality measurement unit for computing a value of a quality measure for the motion vector field;

an interpolation unit for computing a first one of the output images by means of interpolation of pixel values of the input images, the interpolation being based on the motion vector field; and control means to control the interpolation unit on basis of the quality measure, characterized in that the quality measurement unit is arranged to compute the value of the quality measure on basis of the maximum of the differences between the motion vector wherein the motion estimation unit, the quality measurement unit, the interpolation unit, and the control means are implemented using a processor.

2. An image processing unit as claimed in claim 1, wherein the group of pixels of one of the motion vectors is a neighboring group of pixels of the groups of pixels of the rest of the motion vectors.

3. An image processing unit as claimed in claim 1, characterized in that the interpolation unit comprises a motion compensated interpolator to perform the motion compensated interpolation of the pixel values of the input images on the basis of the motion vector field, a non-motion compensated interpolator to perform the alternative interpolation of the pixel values of the input images, and a switch coupled to the motion compensated interpolator and the non-motion compensated interpolator, wherein the switch is controlled by the control means.

4. An image processing unit as claimed in claim 1, characterized in that the interpolation unit mixes intermediate images from the motion compensated interpolation and from the alternative interpolation.

5. An image processing unit as claimed in claim 4, characterized in that the interpolation unit comprises a motion compensated interpolator to perform the motion compensated interpolation of the pixel values of the input images on the basis of the motion vector field, a non-motion compensated interpolator to perform the alternative interpolation of the pixel values of the input images, two multipliers that are controlled by the control means, and an adding unit.

* * * * *